(12) United States Patent
Herbert (10) Patent No.: US 7,116,014 B1
(45) Date of Patent: Oct. 3, 2006

(54) METHOD AND APPARATUS FOR STABILIZING "DC-DC TRANSFORMERS" IN A DISTRIBUTED POWER SYSTEM USING REMOTE SENSE

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 524 days.

(21) Appl. No.: 10/248,422

(22) Filed: Jan. 17, 2003

Related U.S. Application Data (60) Provisional application No. 60/319,083, filed on Jan. 19, 2002.

(51) Int. Cl.
*H02J 1/00* (2006.01)
*H02M 3/00* (2006.01)
*H02J 1/10* (2006.01)
*H02M 3/26* (2006.01)

(52) U.S. Cl. .............. 307/69; 307/36; 307/71; 307/77; 363/15; 363/65

(58) Field of Classification Search .......... 307/55, 307/60, 69, 71, 36, 77; 363/15, 65
See application file for complete search history.

(56) References Cited

U.S. PATENT DOCUMENTS

| | | | | |
|---|---|---|---|---|
| 4,978,906 A | * | 12/1990 | Herbert et al. ............. | 323/361 |
| 6,348,848 B1 | * | 2/2002 | Herbert ...................... | 336/178 |
| 2002/0070717 A1 | * | 6/2002 | Pellegrino ................... | 323/223 |

* cited by examiner

*Primary Examiner*—Brian Sircus
*Assistant Examiner*—Hal I. Kaplan (57) ABSTRACT

The output voltage of a dc—dc transformer having a ratio of approximately m/n, and which is powered from a main power supply having a remote sense input, can be stabilized by feeding the output of the dc—dc transformer to the remote sense input of the main power supply through an amplifier having a voltage gain of m/n.

2 Claims, 10 Drawing Sheets

METHOD AND APPARATUS FOR STABILIZING "DC-DC TRANSFORMERS" IN A DISTRIBUTED POWER SYSTEM USING REMOTE SENSE

CROSS REFERENCE TO RELATED APPLICATIONS

This application claims priority to a provisional patent application Ser. No. 60/319,083 filed Jan. 19, 2002 and entitled Stabilized "DC—DC Transformer" for use with remote sense.

BACKGROUND OF INVENTION

This invention relates to power supplies, and more particularly to power supplies which may be used in a distributed power system. In a distributed power system, there is a main power supply, usually at a higher voltage, and the voltage from the main power supply is distributed throughout the system. At various locations throughout the system, smaller local distributed power supplies convert the distributed voltage to the voltage required locally, usually a much lower voltage. In present day distributed power systems local voltages of less than one volt to a few volts are common.

Usually, the distributed local power supplies are designed and rated for a wide range of input voltage, as an example, not a limitation, 48 volts nominal with a range of 32 to 75 volts. In many instances, this ability to accommodate a range of input voltages is not necessary, because the distributed voltage is (or could be) provided by a closely regulated voltage supply, as an example, not a limitation, 48 volts plus/minus one percent (1%). Many closely regulated power supplies have a remote sense capability, whereby the voltage drop in the conductors to a load may be compensated for.

The ability of the distributed local power supplies to accommodate a range of input voltages is very useful in some circumstances, but where it is not needed, it is wasteful, costly, bulky and adversely effects system performance and reliability. They are much less efficient than necessary and require a number of local controls and protection circuits because of their ability to regulate voltage autonomously. They are difficult to parallel.

Although envisioned for distributed power systems having a plurality of distributed local power supplies, this invention also relates to more simple power supplies wherein a first power supply provides a higher voltage and has a remote sense input, and a second power supply converts the output of the first power supply to a different output voltage.

SUMMARY OF INVENTION

This invention teaches that in a distributed power system in which the main power supply is a closely regulated power supply with remote sensing capability, the distributed local power supplies can be greatly simplified by configuring them as "dc—dc transformers" having no control functions. A "dc—dc transformer" is modeled after the conventional and well understood ac transformer, and may comprise input switches to provide excitation to a fixed ratio high frequency transformer and output rectifiers. The input switches operate at a fixed duty cycle, preferably nearly 100 percent.

With the recent improvements in semiconductor switches and the widespread adoption of synchronous rectifiers, the voltage drops through the switches and rectifiers are becoming small. Therefore, the equivalent turns ratio of a "dc—dc transformer" is approximately equal to the turns ratio of the high frequency transformer embedded therein. There still is some voltage drop through these components, so a more accurate equivalent turns ratio may be defined as the ratio of the input voltage to the output voltage at a defined output load.

As an example, not a limitation, if it were desired to have a local voltage of 2 volts derived from a distributed power system of 48 volts, a "dc—dc transformer" with an equivalent turns ratio of 24 to 1 could be used. With ideal components, if the input voltage were 48 volts plus/minus one percent, the output voltage would be 2 volts plus/minus one percent.

Just as in a practical ac transformer, a practical dc—dc transformer will have errors, in particular load regulation. As the load current is increased or decreased, the voltage drop due to the internal resistance of the dc—dc transformer will vary. In addition, there may be fixed and non-linear voltage drops as the current changes. However, this is analogous to the voltage drops that might be encountered in the conductors from a power supply operating remotely from its load, and for which the remote sense capability of many power supplies is designed to compensate.

By providing the dc—dc transformer with a voltage amplifier from its output with a gain that is equal to the desired equivalent turns ratio, a signal can be generated which can interface with the remote sense circuitry of the main power supply to compensate for load regulation and other errors in the dc—dc transformer to "stabilize" the dc—dc transformer. A dc—dc transformer that has been stabilized in this manner is defined as a "stabilized dc—dc transformer".

The remote sense can adjust the output voltage of the main power supply somewhat, but its range may be limited. It is therefore preferred that the inherent equivalent turns ratio of the dc—dc transformer be as close as possible to ideal, preferably requiring little tweaking of the remote sense at nominal conditions. Fortunately, there are known techniques for winding transformers with arbitrary non-integer turns ratios. See U.S. Pat. Nos. 4,978,906, and 6,348,848, as examples, not limitations.

The stabilized dc—dc transformer may also be used to adapt a main power supply having a remote sense capability to supply a different output voltage by adding a dc—dc transformer at its output. The output of the dc—dc transformer will modify the output of the main power supply by its equivalent turns ratio. By providing a ratio amplifier having its input on the output of the dc—dc transformer and having its gain equal to the ideal transformer ratio, the final output voltage may be stabilized by applying the output of the ratio amplifier to the remote sense input of the main power supply. The dc—dc transformer may provide isolation, in which case, the ratio amplifier must be an isolated amplifier.

This invention is further described and illustrated in the detailed description and the drawings.

DETAILED DESCRIPTION

Figure 1:
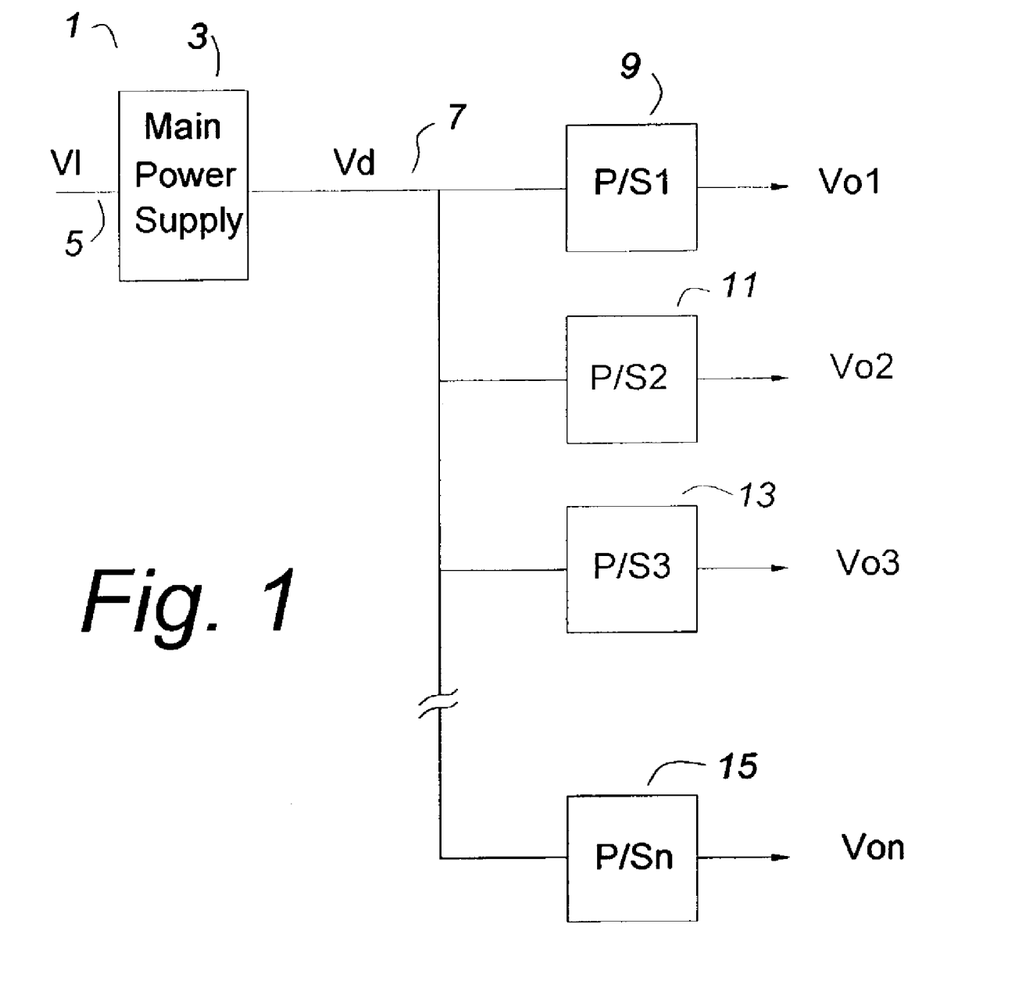
FIG. 1 shows a representative distributed power system.

FIG. 1 shows a typical distributed power system 1 comprising a main power supply 3 which may have an input 5 from line voltage Vl. An output voltage Vd from the main power supply 3 is taken by a distribution bus 7 to a plurality of local power supplies 9, 11, 13, 15 designated P/S1, P/S2, P/S3 to P/Sn having respective output voltages Vo1, Vo2, Vo3 to Von.

There is considerable discretion as to the configuration and connections of the several local power supplies 9, 11, 13, 15, as would be well known to one skilled in the art of power systems. They could all have the same local power supply output voltage, they could all have different output voltages, or there may be some having the same output voltage and others having different output voltages. Those that have the same output voltage may or may not be connected together in parallel.

The main power supply 3 is usually dc power supply and may have an output voltage Vd of any arbitrary design voltage, but 300 volts, 48 volts and 24 volts are common values. Often the main power supply 3 is poorly regulated. This is particularly true if voltage Vd on the distribution bus 7 may be derived wholly, or in some circumstances, from batteries, not shown. If the distribution voltage Vd is poorly regulated, then the local power supplies 9, 11, 13 and 15 preferably include voltage regulation capabilities. This is the usual prior art arrangement.

If, however, the main power supply 3 is, or could be, a tightly regulated power supply having a well controlled output voltage Vd, then the local power supplies 9, 11, 13 and 15 can be simplified significantly. Not only will they be smaller, lighter and more economical, but they can be significantly more efficient. They can comprise "dc—dc transformers", as defined below.

An ideal transformer is characterized by having a turns ratio which determines the relationship of its output to its input. The ideal transformer has no losses, so the power out equals the power in. The voltage out equals the voltage in times the inverse of the turns ratio, and the current in equals the current out times the inverse of the turns ratio. Practical ac transformers are very good, often nearly ideal, particularly at low frequencies. An ideal transformer has infinite flux capacity, so it may operate with a direct current (dc) input, but practical transformers all operate with alternating current (ac) excitation. A transformer may provide isolation or the input and output returns may be common as in an auto-transformer or where the input and output windings are purposefully connected together.

Figure 2:
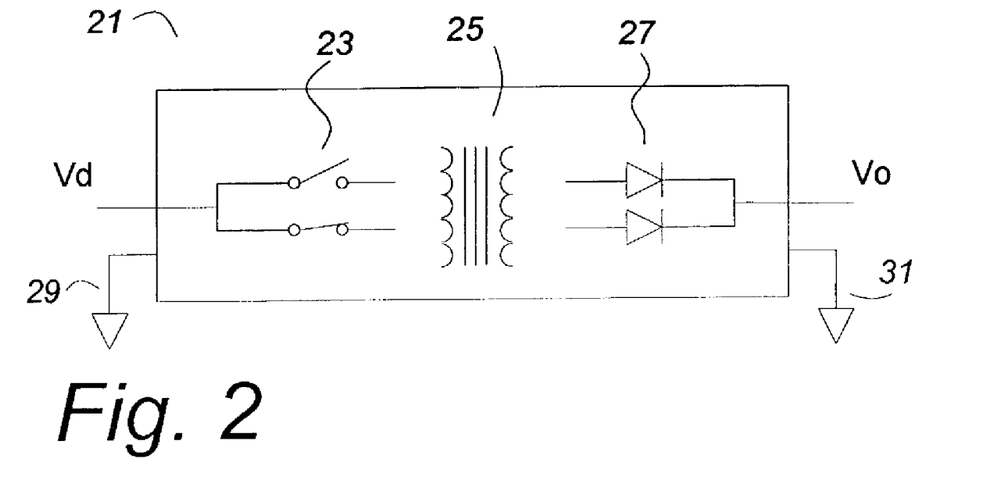
FIG. 2 shows the principle components of a "dc—dc transformer".

For this specification and the claims, a "dc—dc transformer" is an ac transformer circuit further comprising switching circuits on its input to convert a dc input to an ac excitation, and further comprising rectifier circuits on its output to convert the ac output to a dc output. FIG. 2 shows a "dc—dc transformer" 21 comprising a transformer 25, switches 23 to provide an ac excitation for the transformer 25 from an input Vd, and rectifiers 27 to convert the ac output of the transformer 25 to a dc output Vo. The dc—dc transformer 21 may or may not provide isolation. If isolation is provided, then the returns 29 and 31 are not common.

The switches 23 may be arranged in a number of ways, as examples, not limitations, they may be push pull, symmetrical push-pull, half bridge, or full bridge converter circuits. The details of these arrangements would be well known by one skilled in the art of power conversion, and all would be equivalent for the teachings of this invention. Likewise, the rectifiers 27 may be arranged in a number of ways, as examples, not limitation, as push pull or full bridge rectifiers. They may or may not be synchronous rectifiers. All would be familiar to one skilled in the art of power converter circuits, and all would be equivalent for the teachings of this invention. The transformer 25 could be wound in a variety of ways to be compatible with the various switches 23 and rectifiers 27. The switches 23, the transformer 25 and the rectifiers 27 could also, as an example, not a limitation, be a double forward converter circuit, in which case the transformer would comprise two transformers. Further, multiple sets of switches 23, transformer 25 and rectifiers 27 could be used to increase the capacity of the circuit or to improve its performance or both. These would all be familiar to one skilled in the art of power converters, and all are equivalent for the teachings of this invention.

The switches 23 are preferably operated at a 100 percent duty cycle. That means that at least one switch is closed at any given time (except that a small dead-time may be used to optimize the circuit and/or to protect the components of the circuit). However, it is possible that in some applications a duty cycle less than 100 percent could be used. As an example, not a limitation, the equivalent ratio from the input to the output of the dc—dc transformer 21 can be modified as the duty cycle as an alternative to or supplement to the physical number of turns on the transformer 25. If the duty cycle of the switches in each dc—dc transformer 21 in a distributed power system is the same, then the usual issues of unequal current sharing when paralleling distributed local power supply modules will not apply. The duty cycles could be the same because each dc—dc transformer has a precise local oscillator, or they could be the same because a master clock is used to control the duty cycle of the various modules and keep them equal.

If a master clock is used to provide the same duty cycle to a plurality of dc—dc transformers 21 connected in parallel in a distributed system, there nonetheless could be phasing differences from module to module to reduce the overall ripple voltage of the common paralleled output.

Also, a reduced duty cycle could be used only in certain modes of operation, such as to provide a soft start capability or in the presence of a fault or over voltage input. The switches 23 could be turned OFF or ON by command, to provide an OFF-ON function.

Regardless, it is contemplated that the preferred embodiment of the invention, operating in its normal operating mode, the distributed power system comprises "dc—dc transformers" having a fixed ratio from the input to the output determined primarily by the turns ratio of the transformer 25. With ideal components, this would be precisely the case, but practical components have losses which effect the precision of the ratio. As switches 23 and rectifiers 27 improve, the behavior of the dc—dc transformer 21 is becoming better all the time, particularly with the common usage of synchronous rectifiers. Nonetheless, because of voltage drops in the several components, the output voltage will not be a precise reflection of the input voltage. Furthermore, the percentage loss can be expected to vary with operating conditions, particularly load current, but also with other parameters such as temperature. For some applications, these variations, this departure from ideality, may be acceptable. This invention teaches a means for correction where it is not.

A "dc—dc transformer" operating at 100 percent duty cycle has a fixed relationship between its input voltage and output voltage. There is no failure mode within the "dc—dc transformer" that can result in an over voltage condition on its output voltage if the input voltage is correct. Accordingly, there is no need for an output over-voltage sense circuit. Over-voltage sensing in the main power supply will protect the entire distributed power system. While a similar relationship pertains for the input and output currents of the "dc—dc transformer", it may be one of many parallel loads on the main power supply. Over-current sensing and protection, if needed, must therefore be done on each dc—dc transformer, but it can be on either the primary side or the secondary side.

Figure 3:
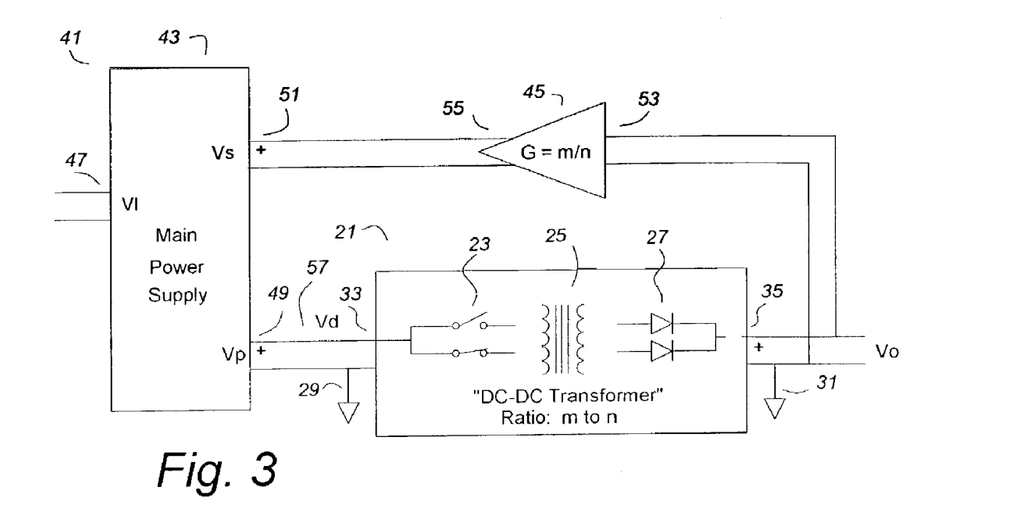
FIG. 3 shows a dc—dc transformer with a ratio amplifier into the sense input of a main power supply.

FIG. 3 shows a power supply system 41 comprising a main power supply 43 supplying power to a bus 57 and thence to a "dc—dc transformer" 21 (from FIG. 2) having an input 33, and having a ratio of m to n, where m to n is the ratio of the nominal value of the dc—dc transformer input voltage Vd, and n is the desired value of the dc—dc transformer output voltage Vo 35. The main power supply 43 derives its input 47 from line voltage V1, and has an output 49 of voltage Vp, which is also the source of the voltage Vd on the distribution bus 57. Ideally, the output voltage Vo would be n/m times Vp. Practically, it will have errors caused by voltage drop in the bus 57 as well as non-ideality of the dc—dc transformer 21. Like reference characters refer to the same elements throughout the Figures.

FIG. 3 further shows that the main power supply has provisions for a remote sense input 51 having a voltage Vs. As would be well known to the one skilled in the art of power supplies, a remote sense input is an input to a power supply which senses the voltage output of the power supply at a remote location. Its purpose is to adjust the control of the power supply to compensate for voltage differences between the output of the power supply and the point where it is remotely sensed, so as to regulate the voltage at the remote point. Normally, this would cause the output voltage to increase just enough to compensate for voltage drops in the distribution system.

This invention teaches that the remote sense input may be used to compensate for the non-ideality of the dc—dc transformer 21. In FIG. 3, the output 35 of the dc—dc transformer 21 is taken to the input 53 of an amplifier 45 having a gain m/n, which is equal to the ideal ratio of the dc—dc transformer 21. Ideally, the step down in the dc—dc transformer 21 would be n/m times Vp, and the step up in the amplifier 45 would be m/n times Vo. Multiplying the gain around the loop, n/m times m/n equals 1, so the voltage at the output 55 of the amplifier 45 ideally equals Vp. To the extent that there are errors in the step down ratio n/m, the output 55 of the amplifier 45 will reflect those errors, and simulate a voltage drop as might be seen in the distribution bus of a power supply having a remotely located load.

If the output 55 of the amplifier 45 is applied to the remote sense input 51 of the main power supply 43, the operating point of the main power supply 43 will change to compensate for the accumulated errors.

In a usual application using remote sensing, the voltage correction will usually be to compensate for a voltage drop in the distribution bus. Thus the power supply will increase its output voltage slightly as compensation. If part of the error to be compensated is a non-ideal transformer turns ratio, and if the non-ideal transformer ratio results in an output voltage that is too high, the remote sense will have to reduce the output voltage of the power supply to compensate for it. Most remote sense power supplies would accommodate this with no problem, but it is an operating condition that should be evaluated carefully to ensure that there are no problems. While too high of an output voltage would suggest a negative impedance in the distribution bus, load regulation would still appear dynamically as a positive impedance, so stability issues would not be anticipated.

Still, there is another reason for preferring that the error simulate a voltage drop. That is, with a simulated voltage drop, the voltage sense input will always be lower than the main power supply output voltage. This has the advantage that the amplifier can have an "open collector" type output with a pull up to the power supply output voltage. This avoids having to have a high voltage power supply for the voltage sense feedback amplifier 45.

Figure 4:
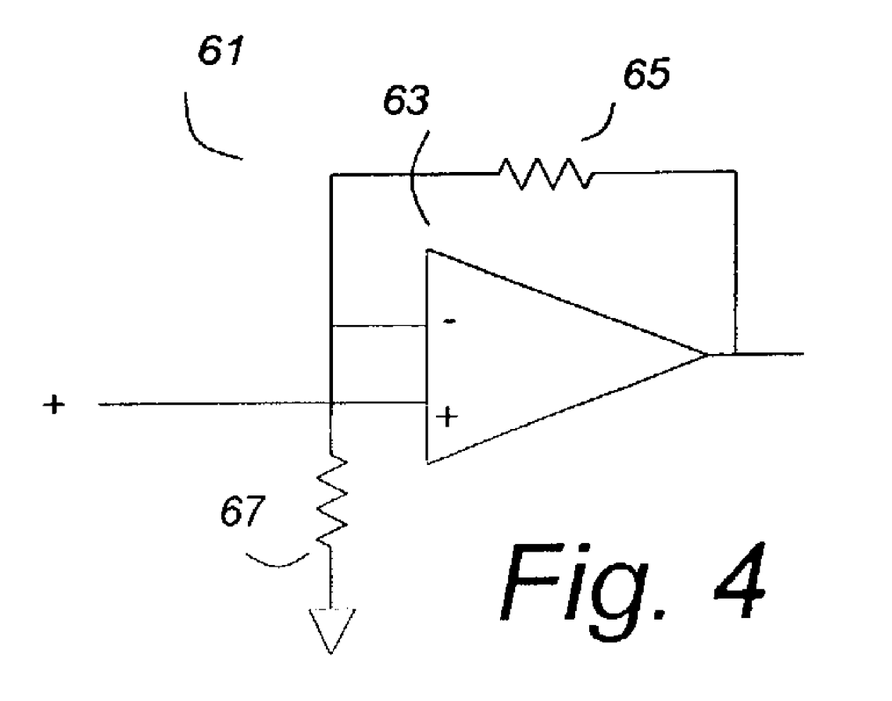
FIG. 4 shows that the ratio amplifier may be a simple operational amplifier network with gain equal to the equivalent turns ratio of the dc—dc transformer.

FIG. 4 shows an amplifier 61 comprising an operational amplifier 63 and a feedback network comprising resistors 65 and 67. For some power distribution systems, this amplifier 61 would be suitable as the amplifier 45 in FIG. 3. The conditions that must be met are that the main power supply 43 and the output of the dc—dc transformer 21 must have a common ground return, and there must not be significant voltage drop in the common ground return.

Figure 5:
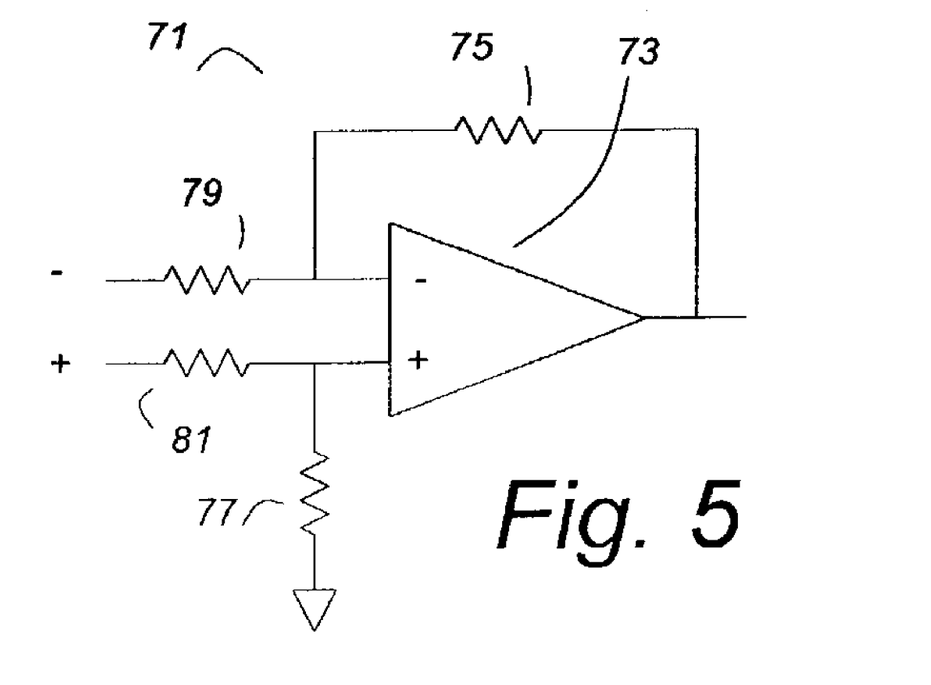
FIG. 5 shows that the ratio amplifier may be a differential operational amplifier network with gain equal to the equivalent turns ratio of the dc—dc transformer.

FIG. 5 shows an amplifier 71 comprising an operational amplifier 73 and a feedback network comprising resistors 75, 77, 79 and 81. This is the familiar differential amplifier, and for some power distribution systems this amplifier 71 would be suitable as the amplifier 45 of FIG. 3. The conditions that must be met is that the main power supply 43 and the output of the dc—dc transformer 21 must have a common ground return, or at least ground returns which were constrained to have a voltage difference within the limits of the differential amplifier. The differential amplifier can accommodate and compensate for voltage drops in the common ground return or reasonable voltage differences between the ground returns.

Figure 6:
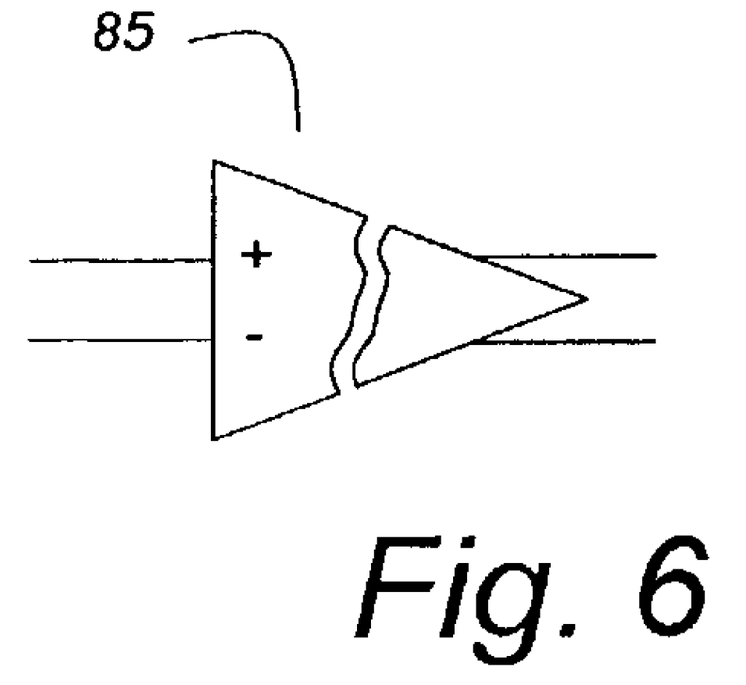
FIG. 6 shows that the ratio amplifier may be an isolated operational amplifier with gain equal to the equivalent turns ratio of the dc—dc transformer.

FIG. 6 shows the preferred amplifier 85 for many embodiments of the invention. The amplifier 85 is an isolation amplifier, and is suitable for a power distribution system where the main power supply 43 and the output of the dc—dc transformer 21 are isolated, that is, they do not have a common ground.

The amplifiers of FIGS. 4, 5 and 6 as well as other amplifiers would be familiar to one skilled in the art of analog circuit design, and all are equivalent for the teachings of this invention.

In some applications, a dc—dc transformer may be used with a standard, unmodified power supply having remote sense. The adjustment range of the main power supply may be limited, and the stability of the main power supply may be compromised by including additional components into its feedback loop through the remote sense.

So that the stabilization of the dc—dc transformer does not require adjustment beyond the range of the remote sense of the main power supply, care should be taken to match the ratio of the dc—dc transformer so that it is as close to ideal as possible at its intended operating conditions, and care should be taken that parametric errors and load regulation do not become too large. The best possible switches and the best rectifiers should be used to minimize voltage drops. Certainly synchronous rectifiers should be used for any low voltage applications. Particular care should be taken if the cumulative errors are positive, that is, if they require a decrease in the main power supply output, as that does not simulate usual operation.

Because the gain of the amplifier is the same as the ratio of the dc—dc transformer, the nominal gain through the added elements is one, and that will not effect the loop stability. Any problems therefore would be due to the frequency response of the components. Accordingly, the transformer 25 should be designed to have a good high frequency response, preferably better than the response of the main power supply. If necessary, the dynamic response of the ratio amplifier could be tailored to compensate for the response of the transformer 25, as would be well understood by one skilled in the art of analog circuit design.

In some applications the main power supply and the dc—dc transformer would be designed either as a set or to a common specification to ensure compatibility. The design techniques, parameters and modifications to ensure stable operation would be well known to one skilled in the art of power supply design. Further, if the main power supply was specifically designed to operate with particular dc—dc transformers, the error sense feedback amplifier could be incorporated into the main power supply. This would be equivalent for the teachings of this invention.

Figure 7:
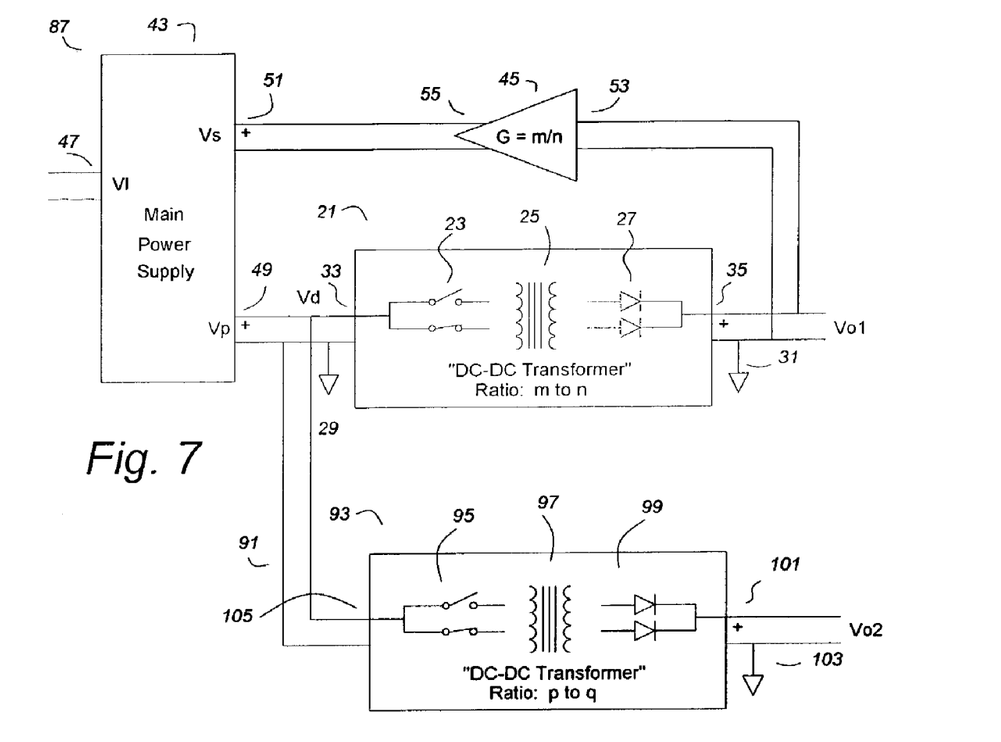
FIG. 7 shows that the different output voltages can be obtained by using dc—dc transformers of different equivalent turns ratios. One ratio amplifier may be used.

FIG. 7 shows a distributed power system 87 comprising a main power supply 43 having an input 47 from line voltage V1 and having an output 49 with an output voltage Vp. A distribution bus 91 distributes power to a first dc—dc transformer 21 and a second dc—dc transformer 93. This will be recognized as the components of FIG. 3 with an additional dc—dc transformer 93 having a ratio of p to q comprising an input 105, switches 95, a transformer 97, rectifiers 99 and an output 101 producing an output voltage Vo 2. The second dc—dc transformer 93 may have an isolated return 103. Any number of local power supplies may be added to the distribution bus 91 as long as the main power supply 43 is appropriately rated.

In as much as the main power supply 43 has only one voltage sense input 51, only one of the local power supplies can have a ratio amplifier feeding directly into it. Therefore only the output 35 of the first dc—dc transformer 21 will be stabilized. There are a number of possible scenarios regarding the arrangement of the other local power supplies.

One possibility is that a plurality of local power supplies having the same ratio are used in a power distribution system and their outputs are all connected in parallel. In this example, one ratio amplifier is sufficient to stabilize the entire power system. Unlike local power supplies containing regulation circuits, the dc—dc transformers comprising the local power supplies of this invention are constructively passive elements having the same impedance. Therefore, the current will divide equally in the several parallel local supplies without requiring any special circuits.

Another possibility is that a plurality of local power supplies having the same ratio are used in a power distribution system, with their outputs not connected in parallel, but with similar loads. Again, one ratio amplifier stabilizes one dc—dc transformer precisely, but the others will be fairly well regulated.

Yet another possibility is that a plurality of local power supplies are used with different ratios and/or different loads. Only one can be stabilized directly using the ratio amplifier to the voltage sense input of the main power supply, but it may be that the loads on the other local power supplies can tolerate slight voltage errors (analogous to cross regulation). This is a trade off of the system. If necessary, the unstabilized local power supplies could incorporate post regulation. This would not need to be the full control circuits usually used in the local power supplies of a distributed power system but would be more like the cross regulation circuits used for transformers having multiple outputs, only one of which is regulated on the primary side.

Figure 8:
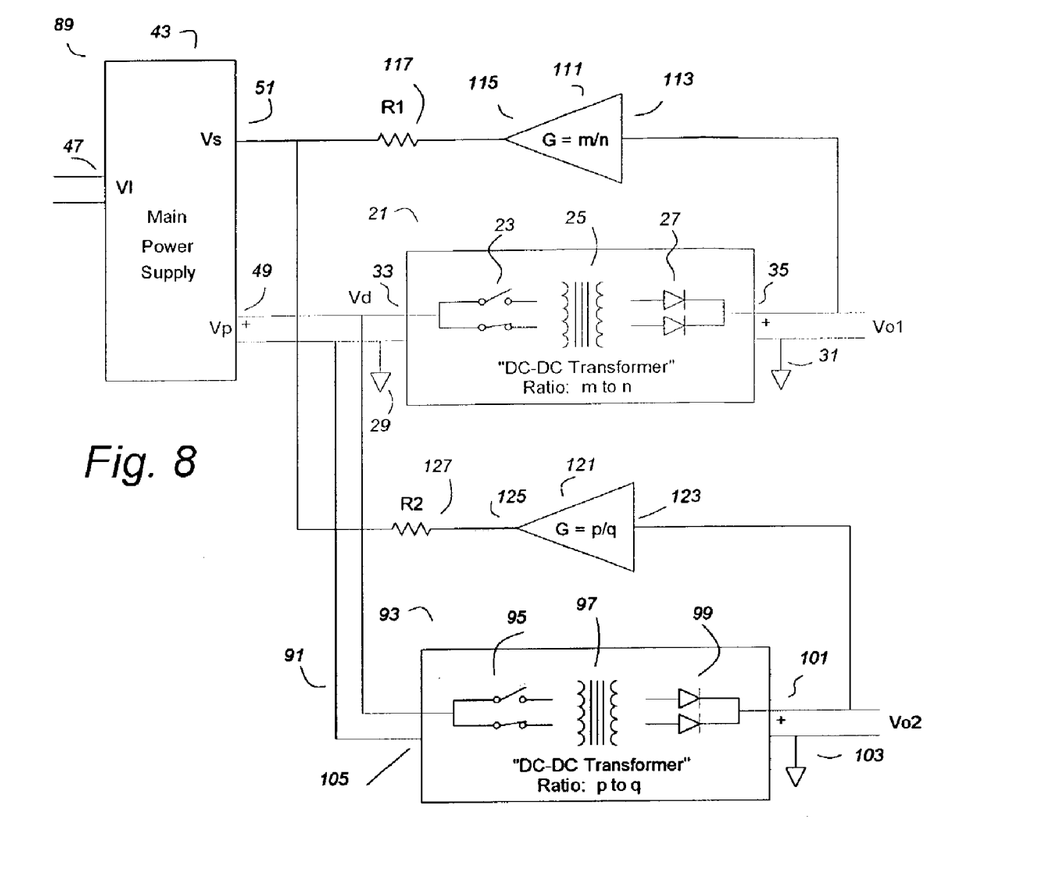
FIG. 8 shows that multiple ratio amplifiers may be used, and their outputs may be weighted or averaged at the remote sense input.

FIG. 8 shows a distributed power system 89 which is the distributed power system 87 of FIG. 7 with a modified ratio amplifier arrangement. Both of the local power supplies 21 and 93 have ratio amplifiers 111 and 121 respectively. Each of the ratio amplifiers 111 and 121 will reflect their respective inputs 113 and 123 to their respective outputs 115 and 125, and both outputs 115 and 125 will be approximately equal to the output voltage Vp of the main power supply 43. These outputs 115 and 125 may be combined through resistors 117 and 127, provided that each of the resistors is high enough so that the amplifiers to which they are attached are not overloaded, and provided that the resistor network has an impedance that is low compared to the input impedance of the remote sense input 51. If this condition is not met, an additional buffering or summing amplifier may be required, as would be well understood by one skilled in the art of analog circuit design.

If R1 117 and R2 127 are of equal value, the outputs of the ratio amplifiers 111 and 121 will be averaged. One skilled in the art of analog circuit design would understand how to make a network which may be specialized in a variety of ways. As examples, not limitations, different value resistors will give different weight (authority) to the ratio amplifiers. It is possible to include diodes inside the individual ratio amplifier circuits so that the main power supply will sense the ratio amplifier that has the highest output or the lowest output. A non-linear response could be used to give more weight to an output that was exceptionally high or exceptionally low.

Although two local supplies are shown, the distributed power system 89 of FIG. 8 can be expanded to include any number of local power supplies as long as the main power supply 43 is appropriately rated.

Figure 9:
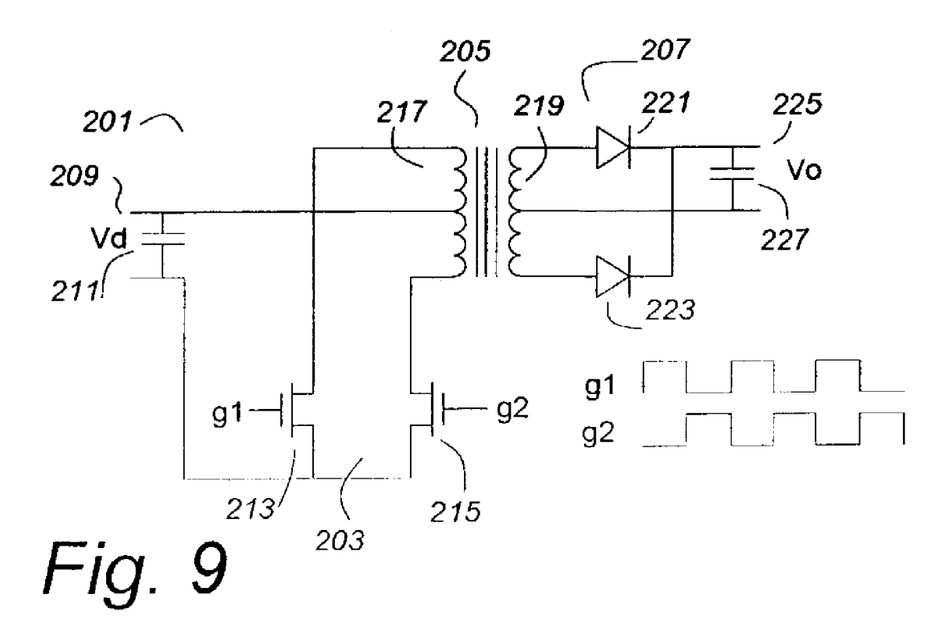
FIG. 9 shows that the dc—dc transformer may be a 100 percent duty cycle push pull converter circuit with a push pull rectified output.

FIG. 9 shows, as an illustration, not a limitation, a possible configuration for a dc—dc transformer of this invention. A dc—dc transformer 201 having an input 209 and an output 225 comprises switches 203 comprising two MOSFET switches 213 and 215 driving a transformer 205 having a primary winding 217 and a secondary winding 219, and having rectifiers 207 shown as two rectifiers 221 and 223. The input voltage Vd may be filtered as by an input capacitor 211, and the output voltage Vo may be filtered by an output capacitor 227.

In designing the dc—dc transformer 201, it is an objective that it be as nearly ideal as possible. The switches 213 ad 215 should be good quality, MOSFETs having a low drain to source resistance when turned on, and the rectifiers 221 and 223 should be synchronous rectifiers, preferably good quality MOSFETs having a low drain to source resistance when turned on. The transform 205 should have as close to the ideal ratio as practical, taking into account the voltage drop through the dc—dc transformer and its intended operating conditions. The gate drive for the MOSFET switches should be robust and fast, with a near 100 percent duty cycle, as shown in the timing diagram in FIG. 9. In FIG. 9, the timing diagrams g1 and g2 show the timing of the gate voltages g1 of the MOSFET 213 and the gate voltage g2 of the MOSFET 215. One skilled in the art of power converters would know that a positive gate voltage turns on an n-channel MOSFET and they would understand how to apply the same reasoning to a p-channel MOSFET. The time is indefinite, as it could vary from application to application. The voltage amplitude is indefinite as Well, for the same reason, but it should be understood to show a gate voltage amplitude sufficient to turn the MOSFETs 213 and 215 on and off. Because there is no instant of time when both g1 and g2 are low simultaneously, the timing diagram shows a 100 percent duty cycle. It can also be seen that the pulses g1 and g2 are essentially equal.

Because of the switching and rectification, the output wave form will not be a perfect dc voltage, so some filtering in the form of capacitors will be necessary, unless the external load capacitance is sufficient by itself. In most cases, the main power supply will be designed to have a capacitive component in its load, but some care is needed to ensure overall system stability. It is important to minimize the series inductance of the dc—dc transformer by using a good transformer having low leakage inductance.

Figure 10:
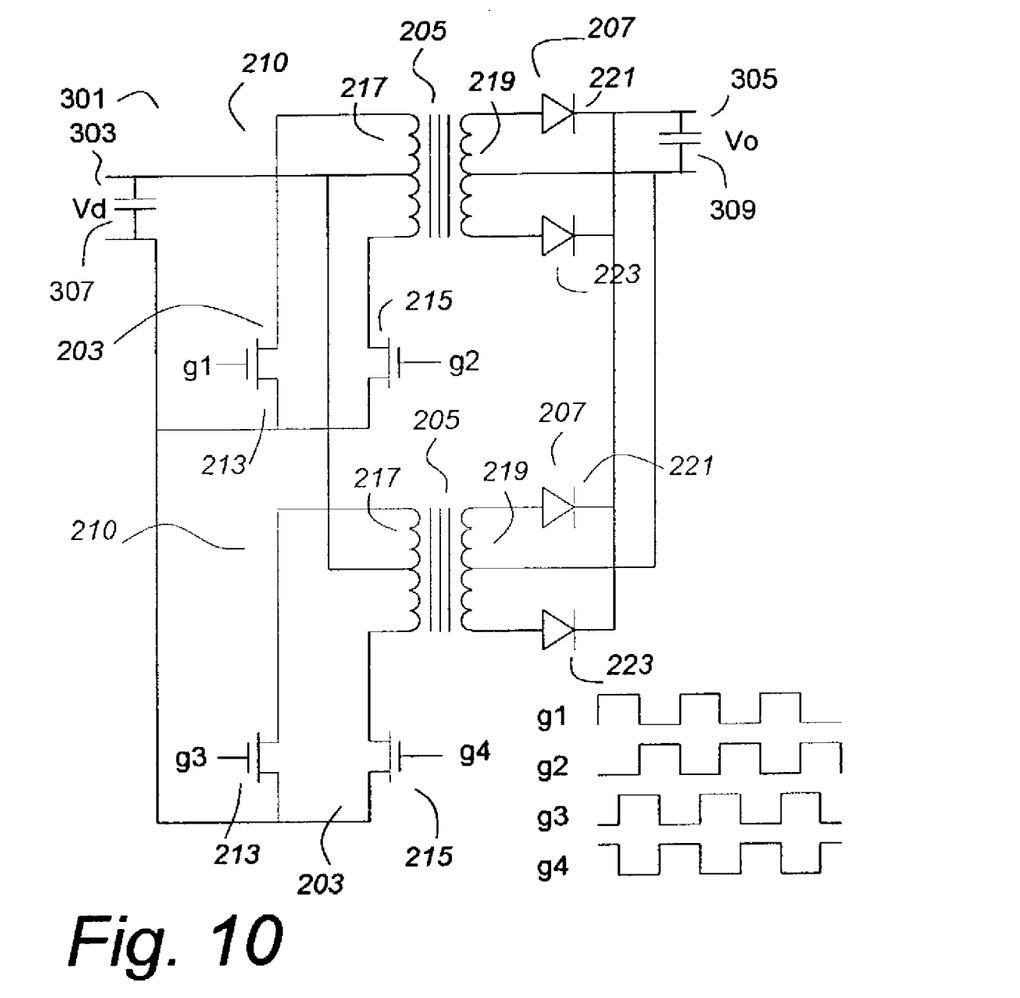
FIG. 10 shows that the dc—dc transformer may be a pair of 100 percent duty cycle push pull converter circuits with push pull rectified outputs in parallel, with their timing offset 90 degrees, for ripple reduction.

FIG. 10 shows a dc—dc transformer 301 having an input 303 and an output 305 comprising a pair of the dc—dc transformers 210, 210 which are the dc—dc transformer 201 of FIG. 9. The MOSFET switches 213, 213, 215, 215 have gate drives 90 degrees out of phase, as shown in the timing diagram in FIG. 10. The input voltage Vd may be filtered as by an input capacitor 307, and the output voltage Vo may be filtered by an output capacitor 309. In FIG. 10, the timing diagrams g1 and g2 show the timing of the gate voltages g1 of the MOSFET 213 and the gate voltage g2 of the MOSFET 215 of a first dc—dc transformer 210 and the timing diagrams g3 and g4 show the timing of the gate voltages g1 of the MOSFET 213 and the gate voltage g2 of the MOSFET 215 of a second dc—dc transformer 210. One skilled in the art of power converters would know that a positive gate voltage turns on an n-channel MOSFET and they would understand how to apply the same reasoning to a p-channel MOSFET. The time is indefinite, as it could vary from application to application. The voltage amplitude is indefinite as well, for the same reason, but it should be understood to show a gate voltage amplitude sufficient to turn the MOSFETs 213 and 215 on and off. Because there is no instant of time when both g1 and g2 are low simultaneously or when both g3 and g4 are low simultaneously, the timing diagrams shows a 100 percent duty cycle. It can also be seen that the pulses g1 and g2 are essentially equal, as are the pulses g3 and g4. Further, the rise and fall times of g1 and g2 occur essential in the middle of the pulses g3 and g4 and vice versa. Thus, when one circuit is switching, the other is ON, in the middle of its ON time. This greatly reduces any discontinuities due to the switching, and the fundamental component of the ripple frequency will be cancelled.

The invention claimed is:

1. A distributed power system having an output voltage which is stabilized comprising
    a main power supply having a main power supply output voltage and a remote sense input,
    at least a first dc—dc transformer having a dc—dc transformer input voltage which is connected to the main power supply output voltage and having a dc—dc transformer output voltage which is an output voltage of the distributed power system,
    and an amplifier means having an amplifier input which is connected to dc—dc transformer output voltage of the at least a first dc—dc transformer and having an amplifier output which is connected to the remote sense input of the main power supply,
    the at least a first dc—dc transformer further having the ratio of its dc—dc transformer input voltage to its dc—dc transformer output voltage equal to m/n, where m is the nominal value of the dc—dc transformer input voltage and n is the desired value of the dc—dc transformer output voltage, and
    the amplifier means having a gain of m/n,
    so as to adjust the main power supply output voltage by varying the remote sense input to stabilize the output voltage of the distributed power system.

2. A method of stabilizing an output voltage in a distributed power system comprising
    procuring a main power supply means having a main power supply output voltage and a remote sense input,
    procuring at least a first dc—dc transformer means having a dc—dc transformer input voltage and a dc—dc transformer output voltage,
    the at least a first dc—dc transformer means having the ratio of its dc—dc transformer input voltage to its dc—dc transformer output voltage equal to m/n where m is the nominal value of the dc—dc transformer input voltage and n is the desired value of the dc—dc transformer output voltage,
    connecting the main power supply output voltage to the dc—dc transformer input voltage of the at least on dc—dc transformer means, procuring an amplifier means having an amplifier input and an amplifier output, the amplifier means having a gain of min,
    connecting the amplifier input of the amplifier means to the dc—dc transformer output voltage of the at least one dc—dc transformer means, and
    connecting the amplifier output of the amplifier means to the remote sense input of the main power supply means
    so as to adjust the main power supply output voltage to stabilize the output voltage of the distributed power system.

* * * * *